(12) United States Patent
Fouquer

(10) Patent No.: US 7,726,914 B2
(45) Date of Patent: Jun. 1, 2010

(54) CUTTING TIP COMPRISING AN ALIGNMENT SLIDE

(75) Inventor: Richard Fouquer, Saint Cyr sur Loire (FR)

(73) Assignee: Safety Production, Boulogne Billancourt Cedex (FR)

(*) Notice: Subject to any disclaimer, the term of this patent is extended or adjusted under 35 U.S.C. 154(b) by 287 days.

(21) Appl. No.: 11/813,362

(22) PCT Filed: Dec. 8, 2005

(86) PCT No.: PCT/FR2005/003078

§ 371 (c)(1),
(2), (4) Date: Feb. 14, 2008

(87) PCT Pub. No.: WO2006/072681

PCT Pub. Date: Jul. 13, 2006

(65) Prior Publication Data

US 2008/0138160 A1    Jun. 12, 2008

(30) Foreign Application Priority Data

Jan. 6, 2005  (FR) .................................. 05 00103

(51) Int. Cl.
*B23C 5/00* (2006.01)
*B23Q 3/00* (2006.01)

(52) U.S. Cl. .......................................... 407/33; 407/40

(58) Field of Classification Search ................ 407/33, 407/40, 66, 67, 25, 41; 409/232, 234
See application file for complete search history.

(56) References Cited

U.S. PATENT DOCUMENTS

| 4,220,429 A * | 9/1980 | Powers et al. ............ 408/224 |
| 5,033,916 A * | 7/1991 | Dunklau .................... 407/33 |
| 6,017,172 A * | 1/2000 | Ukegawa et al. ........... 407/113 |
| 6,378,578 B2* | 4/2002 | Thomas ..................... 144/230 |
| 2009/0175695 A1* | 7/2009 | Endres et al. ............. 407/113 |

FOREIGN PATENT DOCUMENTS

| GB | 2032820 A | * | 5/1980 |
| GB | 2302295 A | * | 1/1997 |

* cited by examiner

*Primary Examiner*—Will Fridie, Jr.
(74) *Attorney, Agent, or Firm*—Hodgson Russ LLP

(57) ABSTRACT

The invention relates to a machining tool holder comprising alignment elements in a housing and clamping elements on the base of the housing, the elements being used to align and clamp a removable cutting tip comprising a lateral slide for the lateral deviation of a pressure force exerted by a screw belonging to the tool holder, the screw being guided such that it abuts obliquely against the lateral slide in order to push the slide, and consequently the tip, back towards a longitudinal alignment side which defines the housing and which serves as an alignment end stop for the associated alignment edge of the tip. In this way, the tip is oriented as desired in order to slide along the longitudinal side and abut against a rear alignment side.

30 Claims, 6 Drawing Sheets

CUTTING TIP COMPRISING AN ALIGNMENT SLIDE

CROSS REFERENCE TO RELATED APPLICATIONS

This application claims priority of International Patent Application No. PCT/FR2005/003078, filed Dec. 8, 2005, which claims priority of French Patent Application No. 05 00103, filed Jan. 6, 2005, both of which are incorporated by reference herein.

FIELD OF THE INVENTION.

This invention relates to the mounting of a cutting plate on a tool holder.

BACKGROUND

To machine a part, a cutter with two removable cutting plates pressed and attached to respective base surfaces of two radial housings axially opposite one another is conventionally used. Each base surface has at its center a threaded attachment hole with which a clamping screw is engaged, passing through a smooth attachment hole provided in the thickness of the plate, in order to press a contact face thereof on the base.

However, as the screw has a certain lateral clearance with respect to the threading, in order to facilitate the screwing, such a screwing can control only one degree of freedom in translation, in the "vertical" direction, in order to hold the contact face of the plate secured in the plane of the base of the housing.

To control the two other degrees of freedom in so-called horizontal translation, in its plane, i.e. to precisely align the plate with respect to its desired position on the base, and also to prevent a parasitic rotation on it, the housing also comprises a series of two lateral sides on which two flanks of the plate come into contact.

Nevertheless, the alignment precision remains limited, because the necessary clearance between the screw and the threading occurs laterally between each flank and the opposite housing side.

It is possible to thrust the plate forward in order to position it in the desired corner of the housing. However, the manual alignment of the plate is sometimes difficult to achieve, and there is the possibility of a positioning error.

SUMMARY OF THE INVENTION

This invention is intended to provide another mounting solution, making it easier to mount and limiting the risk of improper alignment in a cutter housing or any other tool holder.

To this end, the invention relates first to a removable cutting plate comprising mounting means provided to cooperate with alignment means associated with a tool holder so as to bring a contact face of the plate into a functional position on the base of a housing of the tool holder. The mounting means includes a frontal thrust surface provided in order to receive, once the plate is in an initial, approximately functional position, a thrust force exerted by an alignment segment, in the predetermined direction of trajectory, belonging to a slide mounted on the tool holder, so as to align, by sliding toward the rear on the base, a rear flank for alignment of the plate against a rear alignment side delimiting the housing, wherein the plate is characterized in that the mounting means comprise a lateral slide for alignment of the plate and for guiding the alignment segment toward the frontal thrust surface, and the lateral slide is arranged so as to form, with respect to the direction of trajectory, a wedge for offsetting the thrust force of the alignment segment toward a longitudinal flank for lateral alignment of the plate.

Thus, the slide constitutes a mobile jaw controlling at least two degrees of freedom in translation, which enables the longitudinal side first to be set down on the longitudinal alignment side, so that the latter will then constitute a lateral slide for the longitudinal flank. Thus, the plate is first oriented as appropriate, and its final movement, for rear contact, is a simple translation, without rotation on the base of the housing, so that there is no risk of improper final orientation of the clamped plate. In addition, as it is a single means, the alignment segment, that successively exerts the two actions, respectively, of lateral translation, with contact on the longitudinal side, which will adjust the orientation of the plate, and of rear translation, the operator needs to perform only one action, requiring no dexterity. The lateral slide may be a sort of cam that transforms the movement of the alignment segment into successive movements of the plate having the desired direction in order to align it toward a female corner edge separating the two alignment sides of the housing.

The fact that the slide is guided by the tool holder facilitates the control of the direction in which the plate is thrust, and in particular the control of the angle of incidence on the lateral slide. However, it is possible to use the tip of a rod, for example a screwdriver, to thrust the lateral slide, insofar as the operator exerts a thrust force having substantially the desired direction.

It should be noted that the invention is intended to solve the problem of alignment, while the problem of clamping in the aligned position is marginal here. The slide can be designed for clamping against the base, but it is also possible to provide a specific element for this purpose.

It is noted that if the alignment segment has a general ball shape, as in the example of the following detailed description, i.e. if the alignment segment has two points or areas of contact, respectively with the lateral slide and the frontal thrust surface, contacts which are relatively close, the lateral slide has a front portion that is located ahead of the frontal thrust surface, so as to ensure the desired guiding toward the latter. Alternatively, it is possible for the alignment segment to have a sort of guide rostrum directed toward the rear and designed to slide on the lateral slide, with, at the base of the rostrum, a shoulder constituting the frontal thrust surface. In such a case, the frontal thrust surface can be located ahead of the lateral slide.

The lateral slide and the longitudinal flank have, for example, respective directions of extension that are mutually tilted, i.e. they can constitute a corner of which one of the flanks, i.e. the lateral slide, will be thrust laterally in order to press the opposite longitudinal flank against the longitudinal alignment side.

The lateral slide and the rear alignment flank advantageously have respective directions of extension delimiting an angle greater than 45 degrees.

The lateral slide preferably extends in a direction of extension cutting, from the plan view, the rear alignment flank.

According to an advantageous embodiment, the lateral slide may have a shoulder delimiting, on an upper face of the plate opposite the contact face, a plate also limited by the longitudinal flank.

Preferably, as mentioned above for a ball-shaped alignment segment, the lateral slide may end at the frontal thrust surface.

The frontal thrust surface is advantageously a ramp for clamping against the base, so that it fixes two degrees of freedom, namely the rear alignment and the clamping against the base.

However, it is advantageously possible for a rear slide segment of the lateral slide to be turned partially opposite the contact face in order to act both as said lateral offsetting slide and as the ramp for clamping against the base. The rear slide segment can thus be twisted as it goes toward the rear, and specifically by turning progressively toward the front and opposite the contact face, so that a final segment of the rear slide segment constitutes said frontal ramp surface.

It is possible for a rear slide segment of the lateral slide provided for a final lateral tightening stroke by the alignment segment after lateral alignment, has a direction of extension different from a direction of extension of a front slide segment of the lateral slide, so as to fix, at the end of the stroke, for a predetermined length of the rear slide segment, a predetermined deflection value of the alignment segment. The alignment segment can thus exert the soft lateral thrust according to a predetermined wedge effect angle, and then exert a clamping force according to another wedge effect angle.

Conveniently an upper face of the plate, opposite the contact face comprises a slide lock-in stop.

The invention also relates to a machine tool holder comprising means for alignment, on the base of a housing, of a removable cutting plate with a frontal surface for thrusting toward a rear alignment side delimiting the housing and with a lateral slide for alignment of the plate and for guiding according to the invention, which tool holder is characterized in that the alignment means comprise means for guiding and holding in position a slide that comprises an alignment segment arranged so as, on the one hand, by sliding on the lateral slide, to laterally thrust the plate toward a longitudinal alignment side delimiting the housing and serving as an alignment stop for an associated longitudinal alignment flank of the plate, and so as, on the other hand, to be guided by the lateral slide up to the frontal thrust surface so as to thrust the plate toward the rear alignment side.

The alignment segment is advantageously arranged so as, after lateral alignment, to slide on a rear slide segment having a direction of extension designed so that the alignment segment exerts, by a wedge effect, a lateral elastic return force toward the longitudinal alignment side.

The lateral bending energy stored by the slide thus makes it possible to counter the vibrations.

The lateral slide can have a direction of extension of a sliding axis forming, with a sliding direction of the slide, a wedge angle between 10 and 45 degrees. The lateral thrust is thus facilitated, with a "soft" landing on the longitudinal alignment side. If the wedge angle is non-negligible, the plate will be thrust both substantially laterally and substantially toward the rear, so that the landing angle will be relatively small, facilitating the subsequent sliding on the longitudinal alignment side. If, on the other hand, the wedge angle is small, the thrust of the plate will essentially be lateral and the landing angle will therefore be greater than in the previous case, but with a relatively low landing speed since the forward axial speed of the slide will involve, due to the reduced wedge angle, a low lateral chase speed.

The alignment segment is preferably slidably mounted in a direction of trajectory cutting, from a plan view, the rear alignment side.

The alignment segment and the lateral slide are advantageously arranged so that the alignment segment also exerts a clamping force toward the base of the housing.

The guide means advantageously include a guide hole for a guided segment of the slide associated with the alignment segment.

It is possible for a mouth portion of the guide hole to be flared in a predetermined direction, or in a plurality of directions. The functional length of the hole is thus variable according to each possible radial direction, so that it makes it possible to adjust the cantilever length of the alignment segment, and therefore, similarly, the bending moment of the neck of the slide bearing the alignment segment. It is therefore possible, at the end of the stroke, for the lateral slide to comprise a rear slide segment having a certain tilt forming, in a transverse direction with respect to the direction of extension of the lateral slide, a ramp on which the alignment segment will progressively climb, so as to thus move in another radial direction with respect to the guide hole. The mouth area of the guide hole can then have a flare so as to increase the cantilever length of the alignment segment and thus limit the bending stress to which it is subjected by the reaction of the rear slide segment.

The guide hole preferably has a sliding axis direction of extension defining a direction of compression of the slide moving away from a general axis of the tool holder, in this case a cutter. It is thus possible for the centrifugal force of the cutter to contribute to maintaining the position of the slide inserted in the functional clamping position.

The alignment segment can be mounted so as to rotate freely with respect to the guided segment of the slide, so that, if the slide is a screw, the friction of the alignment segment is limited to its stroke in the sliding direction.

The longitudinal alignment side can be radially internal with respect to the general axis of the tool holder, and it can extend substantially in a plane moving away from the general axis when moving away, in the axial direction, from a free end of the tool holder.

The base of the housing extends, for example, in a plane that is tilted with respect to the general axis of the tool holder, so as to thus best adjust the angle of attack of the part to be machined. It is thus possible, according to the tilt, to perform a so-called positive cut or negative cut. In the case of a positive cut tilt, it is the frontal end of the plate, for example, in a quarter-circle, that comes into contact first with the part to be machined, i.e. at the level of the general axis, in the manner of a screw attracting material by a spiralling penetration. In the case of a negative cut, the material tends to be thrust.

In such a case, the tool holder can comprise another housing having a base extending in a plane having a tilt, with respect to the general axis, in the direction opposite that of said tilt of said housing.

The two associated plates therefore exert opposite effects of attraction and thrust of the material, which are at least partially neutralized, in consideration of the value of each angle of tilt and any difference in axial and/or radial forward movement between the two plates.

The housing advantageously includes a slide lock-in stop, wherein the slide has a predetermined length and the stop comprises two opposite ends delimiting a ramp surface that is oblique with respect to a direction perpendicular to a guiding direction of the slide defined by the guide means, wherein said opposite ends are located, with respect to a current, or running, contact point of the slide on a mouth of the guide hole, at distances respectively less than and equal to the length of the slide.

The rear alignment side can be turned down so as to extend substantially according to an acute angle with respect to the base of the housing and thus form a ramp holding down a rear alignment flank of the plate toward the base of the housing.

In a specific embodiment, for a reversible plate, the base of the housing comprises a groove for receiving a rib of the plate bearing a second frontal thrust surface associated with a rear contact shoulder for contact on an end surface, for rear alignment contact, belonging to the groove.

The tool holder, for example a cutter, can comprise at least three of said housings. A first of the housings can be arranged so that a cutting edge of the plate extends radially up to a general axis of the cutter, with a second of said housings being arranged so that the associated cutting edge stops at a distance from the general axis.

The invention finally relates to a method for positioning a cutting plate in a tool holder housing, characterized in that:
- a tool holder according to the invention is obtained, and is equipped with a plate according to the invention, with a frontal thrust surface and a lateral slide for aligning and guiding the alignment segment toward the frontal thrust surface,
- the plate is placed on the base of the housing in a substantially functional position,
- the slide is caused to slide, so that the alignment segment performs, in a first phase, a lateral alignment of the plate against the longitudinal alignment side, by sliding with lateral thrust on the lateral slide so that the alignment segment is guided up to the frontal thrust surface so as to cause, in a second phase, an alignment against a rear side of the housing.

Preferably, a direction of extension of a rear segment of the lateral slide, for said guiding toward the frontal thrust surface, is chosen so that the alignment segment exerts, by a wedge effect, in the second phase, an elastic return force toward the longitudinal alignment side.

BRIEF DESCRIPTION OF THE DRAWINGS

The invention can be better understood with the help of the following description of a preferred embodiment of a tool holder, in this case a cutter, and a cutting plate according to the invention, and an alternative, in reference to the appended drawing, in which.

PREFERRED EMBODIMENT OF THE INVENTION

Figure 1:
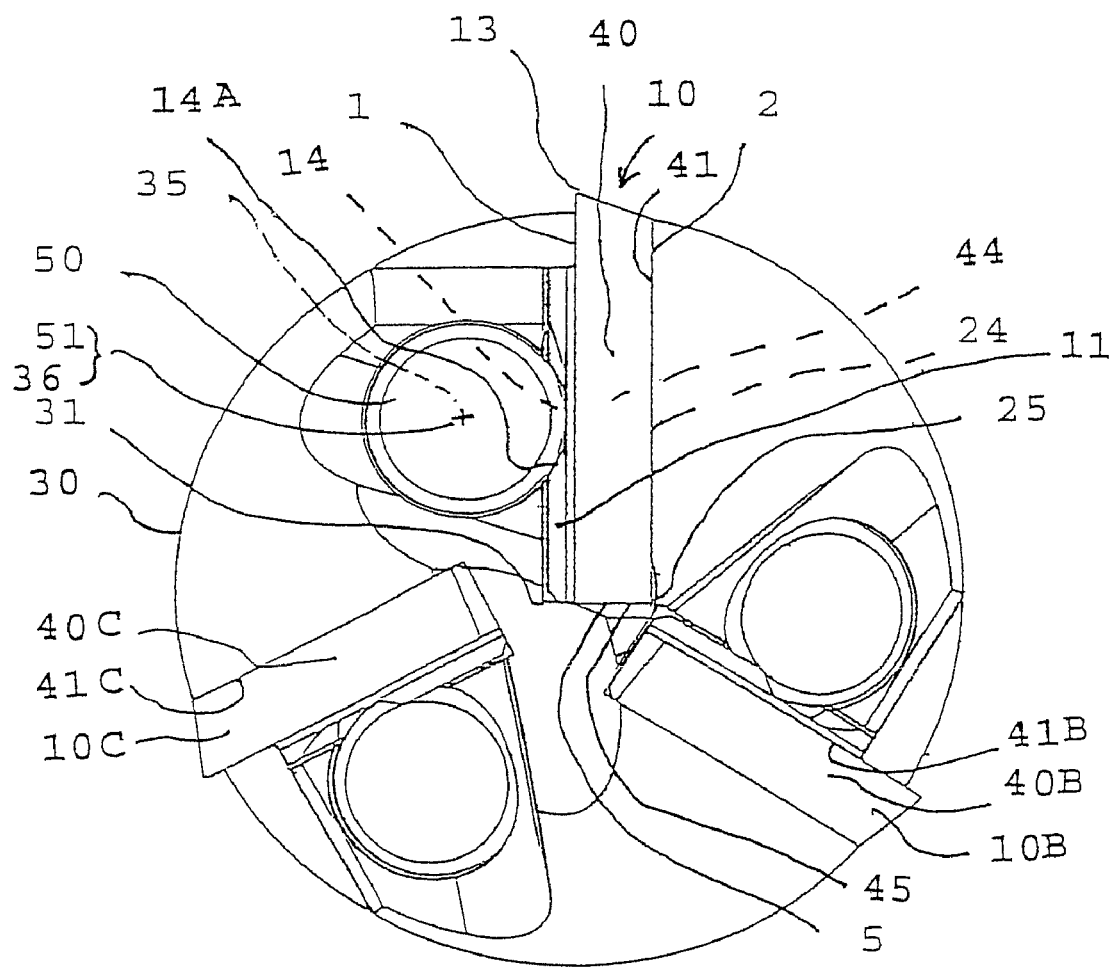
FIG. 1 is a general representation showing an axial view from the end of the cutter of the invention equipped with three plates according to the invention.
Figure 2:
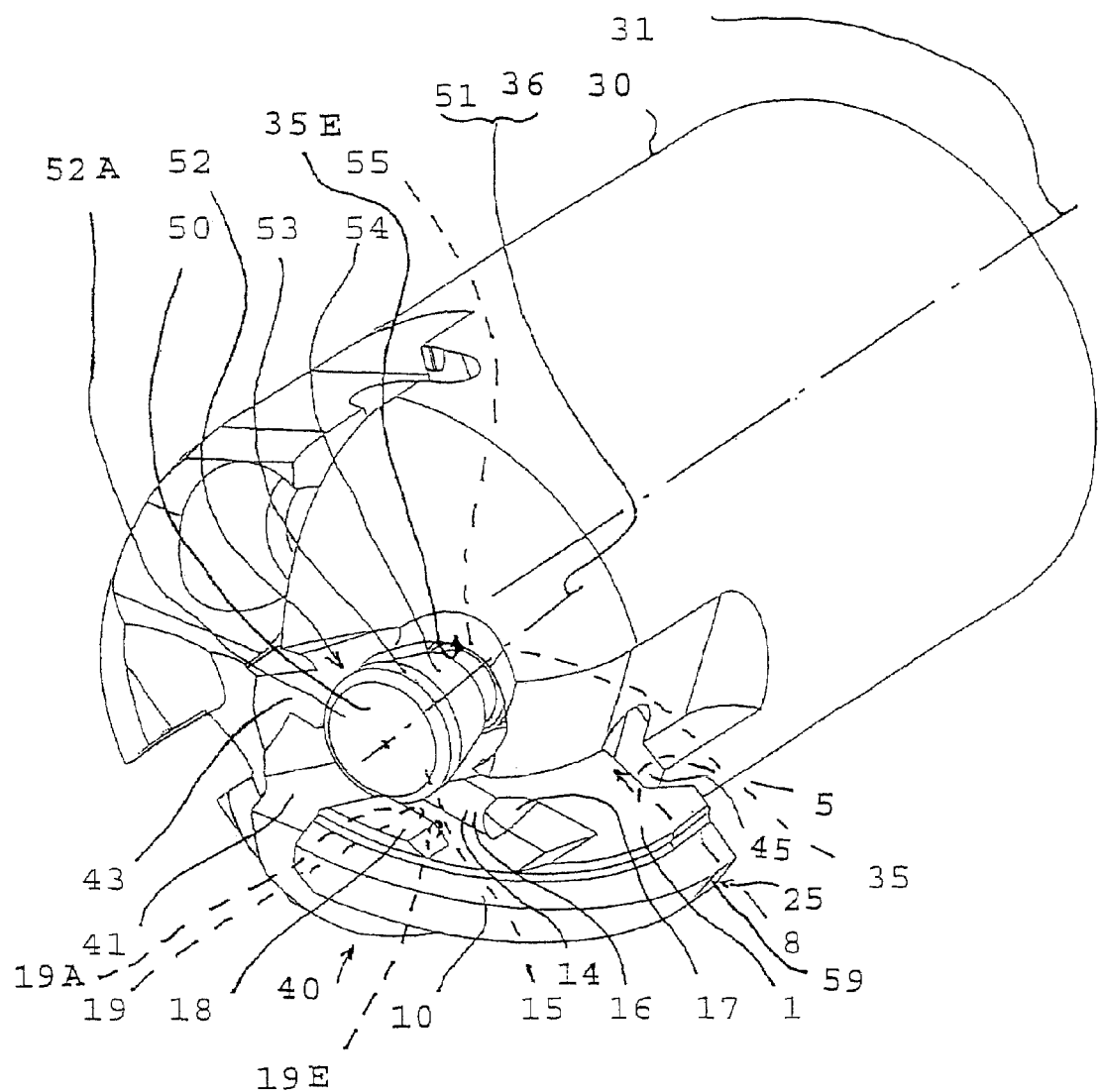
FIG. 2 is a perspective view of a cutter of the type shown in FIG. 1, and shows in particular a lock-in stop arrangement of an alignment and clamping screw.

FIGS. 1 and 2 show a tool holder that is in this case rotary, in the form of a cutter 30 with a general axis 31 of symmetry and rotation, comprising, at a front end, a plurality of, in this case three, housings 40, 40B, 40C, substantially similar, comprising respective bases 41, 41B, 41C extending in respective planes of extension that are substantially axial, and also nearly radial except the thickness of the associated plates 10, 10B, 10C, with respect to the general axis 31, and substantially equidistributed around it.

For the sake of conciseness in the description, only the housing 40 and the associated plate 10 will be described, with this description being valid for the two other pairs of such elements, unless otherwise indicated. For the sake of simplicity in the description, the base 41 has a plane of extension that is assumed to be horizontal, although the description obviously remains valid, when applied as desired, to these elements oriented differently.

Figure 3:
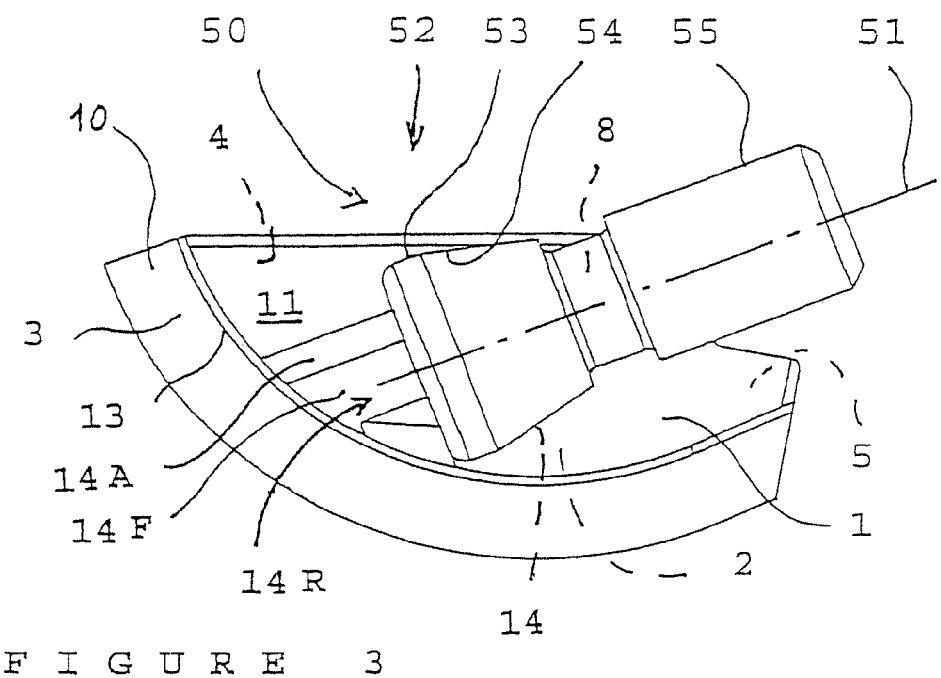
FIG. 3 is a partial perspective view of a plate having a frontal ramp and a lateral slide receiving the alignment and clamping screw head.
Figure 4:
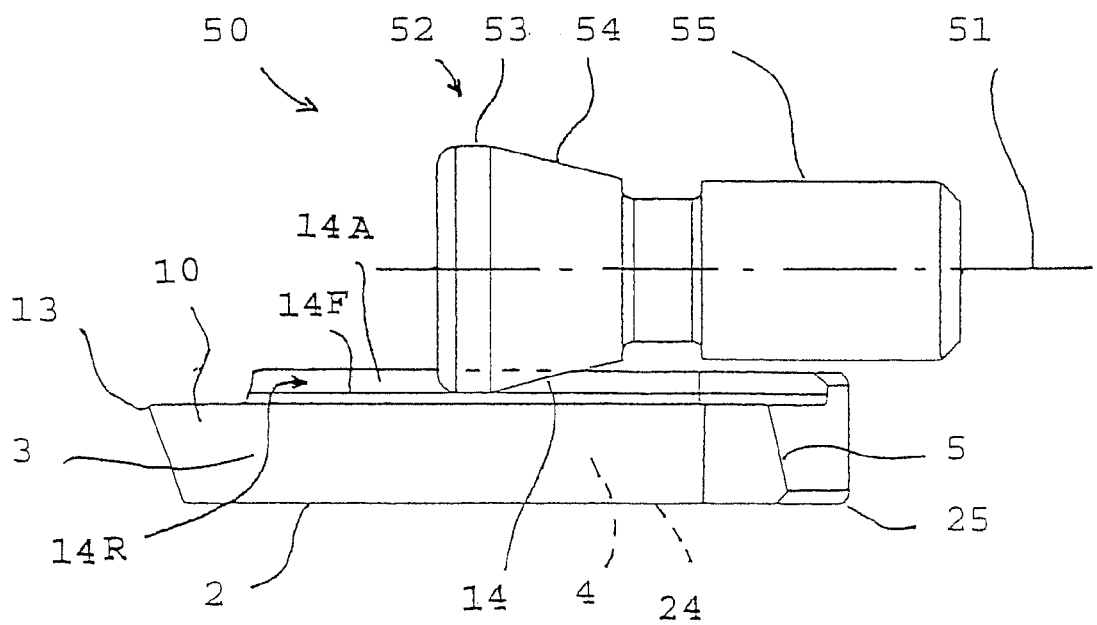
FIG. 4 is a partial lateral view of the plate shown in FIG. 3.
Figure 5:
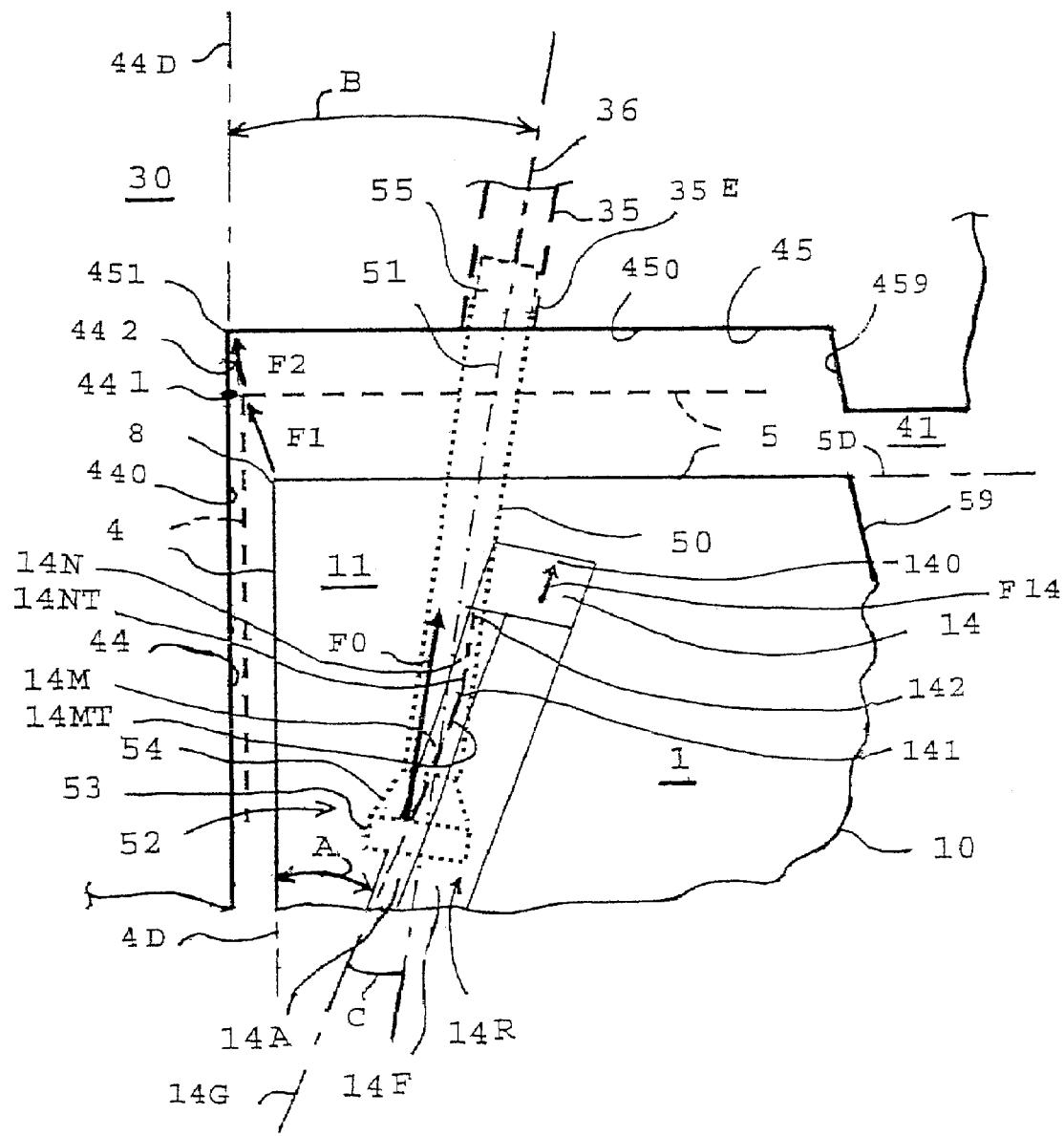
FIG. 5 is a top view of the plate of FIGS. 3 and 4 and of a corresponding housing of the cutter.

As shown in FIGS. 3, 4 and 5, the plate 10 comprises an upper face 1 opposite a lower face 2, for contact on the base 41, as well as three flanks, namely an active flank 3, delimiting, with the upper face 1, a cutting edge 13 having, in this example, a curved quarter-circle profile for front and lateral attack for a hemispheric cut, a radially internal longitudinal flank 4, in a direction of extension 4D, substantially parallel, in a functional position, to the general axis 31, which is connected, by a substantially vertical corner edge 8, to a rear alignment flank 5, axially behind and having a substantially radial direction of extension 5D. The lower face 2 delimits, with the respective flanks 4 and 5, a longitudinal lower edge 24 and a rear lower edge 25, both non-functional.

The housing 40 has, from the plane view, a contour corresponding to the profile of the plate 10, of which the lower face 2 can slide on the base 41, which is delimited, on the one hand, by a radially internal longitudinal side 44, in the direction of extension 44D (FIG. 5), opposite which the longitudinal flank 4 is wedged, in the direction of extension 4D, and delimited, on the other hand, beyond a vertical female corner edge 451 receiving the corner edge 8, by a rear alignment side 45, generally radial and axially behind, acting as an alignment stop for the rear alignment flank 5 when the plate 10 is axially thrust toward the rear when it is mounted. In this example, the rear alignment flank 5, and the opposite rear alignment side 45, each have, over their lengths, a series of a plurality of areas not mutually aligned for forming, from a plan view of the housing 40, a slot for an approximate alignment when the plate 10 is put into place, wherein one of the aforementioned areas serves as a rear alignment stop area. The housing 40 is open laterally at its end, to allow the cutting edge 13 to protrude.

For its aligned positioning and clamping, the plate 10 comprises two elements, namely a frontal ramp 14, occupying an axially withdrawn position on the upper face 1 and located at a certain distance from the longitudinal flank 4, and a lateral slide 14A, closer to the longitudinal flank 4. The frontal ramp 14 generally rises toward the rear, i.e. it is tilted with respect to the lower face 2 and at least partially turned opposite the rear alignment flank 5, i.e. turned at least partially opposite the rear lower edge 25. The frontal ramp 14 serves to receive, in abutment, an alignment segment 52 belonging to a screw 50, acting as a slide for alignment and then clamping of the plate 10, so as to fix at least two degrees of freedom of the plate 10, namely aligning the plate 10 in a predetermined axial position with respect to the cutter 30 and holding it against the base 41.

The alignment segment 52 cooperates as well, and first, with the lateral slide 14A, located on the upper face 1 and extending, in a laterally tilted manner, obliquely over the trajectory of the alignment segment 52 during the screwing, so as to form an obstacle so that the alignment segment 52 laterally chases the plate 10 toward the longitudinal side 44, so as to first ensure the desired lateral alignment of the longitudinal flank 4, before reaching the rear alignment position.

For the coupling of the screw 50 with the cutter 30, the housing 40 is associated with a threaded guide hole 35 with a sliding axis 36 in this case very approximately parallel to the general axis 31, and therefore, consequently, very approximately parallel to the base 41, and relatively close to the general axis 31, i.e. the guide hole 35 is pierced in a central core area of the cutter 30. The guide hole 35 receives, on a wall area, a guided segment 55 of a body of the screw, with an axis 51, thus guided so as to slide axially. The alignment segment 52 clamps the plate 10 by means of a head with a conical portion 54 designed to thrust the frontal ramp 14, and therefore the plate 10, into an axially rear aligned position, by thrusting the alignment flank 5 toward the rear until it comes into rear stopping contact with the rear alignment side 45, after the preliminary lateral alignment against the longitudinal side 44. Once it has reached the rear stop position, the alignment segment 52 rises by sliding on the frontal ramp 14, so as to thus, by a wedge effect, compress the lower face 2 of the plate 10 against the base 41.

To ensure better guiding in the desired translation direction according to the sliding axis 36, the conical portion 54, with a taper adapted to the slope of the frontal ramp 14, is extended toward a front and radial free end surface 52A of the alignment segment 52, by a substantially cylindrical portion 53 centred on the axis 51 and in lateral sliding contact with a lateral guide surface 43, with generatrices parallel to the sliding axis 36, preferably as in this case like a cylinder portion, in this case delimiting an external trajectory volume located above the housing 40 and reserved for the alignment segment 52. The lateral guide surface 43 functionally constitutes a complement extending the wall area of the guide hole 35, with the lateral guide surface 43 forming an elevated portion of the longitudinal side 44 located above the level of a plane of general extension of the upper face 1, which plane is substantially radial, as mentioned above.

When the screw 50 is screwed, the alignment segment 52 cooperates as well, and first, with the lateral slide 14A, with a width having a certain vertical component so as to constitute a lateral ramp for lateral offset of the path of the plate 10 on the base 41. The lateral slide 14A is thus arranged obliquely on the trajectory of the alignment segment 52 representing said external trajectory volume, geometrically forming a cylindrical casing, aligned according to the sliding axis 36, so that the alignment segment 52 laterally chases the plate 10 toward the longitudinal side 44, so as to ensure the desired lateral alignment of the longitudinal flank 4 before the frontal alignment against the rear alignment side 45 takes place. A rear slide segment 14N of the slide 14A preferably also extends obliquely with respect to the trajectory, in the space above the housing 40, of the alignment segment 52 according to the sliding axis 36.

Thus, once the lateral alignment is acquired by lateral "landing" of the longitudinal flank 4 so that the corner edge 8 is located at an intermediate contact point 441 (FIG. 5), on the longitudinal side 44, located at a rear end of a front segment 440 on the longitudinal side 44, the alignment segment 52 and the associated portion of the screw body 50, in a cantilever position outside of the guide hole 35, must bend in a direction opposite the lateral slide 14A, when the screwing is continued. In this way, the alignment segment 52, thus bending in a radially external direction of the general axis 31, exerts an increasing return force of the plate 10 toward the longitudinal side 44 constituting an opposite lateral slide. The bending energy indeed increases during the screwing since the action of the return force remains stored as potential energy, because it cannot produce movement in the laterally aligned state. It represents an elastic lateral return force exceeding a threshold value in order to maintain the lateral alignment in the event of vibration during use.

In a final phase of clamping after placement in the aligned position, the alignment segment 52 is therefore, by a reaction of the frontal ramp 14 on which it rises, thrust in the direction opposite the base 41, therefore vertically in FIG. 4, possibly with bending in this direction since the alignment segment 52 is in a cantilever position with respect to the guide hole 35 and, in addition, since the lateral guide surface 43 cannot provide a reaction with a vertical component since it extends in this case substantially vertically, i.e. parallel to the direction of reaction of the frontal ramp 14.

Figure 6:
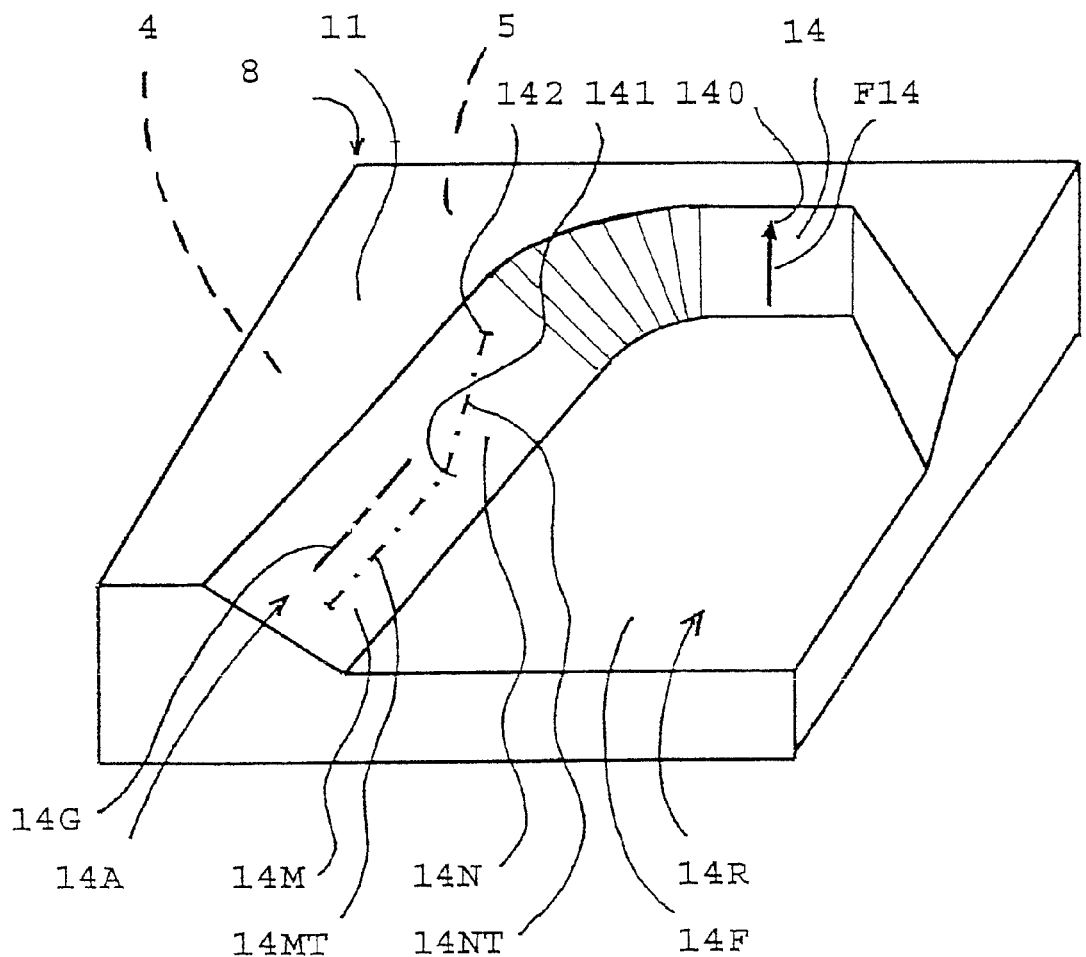
FIG. 6 is a front perspective view of the plate of FIG. 5.

FIGS. 5 and 6 respectively show a top view and a front perspective view illustrating the relative arrangement between the frontal ramp 14 and the lateral slide 14A.

FIG. 5 shows that the plate 10 to be clamped is initially placed freely in an approximately functional position with respect to the desired clamping position, i.e. the longitudinal flank 4 very approximately has the desired orientation, approximately parallel to the longitudinal side 44, but the longitudinal flank 4 and the rear alignment flank 5 are respectively at some distance from the longitudinal side 44 and the rear alignment side 45, respectively.

The frontal ramp 14, which constitutes a rising frontal stop for the conical portion 54 in its rear translation movement according to the sliding axis 36, is preceded by the lateral slide 14A with a "horizontal" extension having, as indicated, a direction of extension 14G (assuming that the plate 10 is appropriately oriented) which is slightly oblique, according to a wedge angle C in this case smaller than 30 degrees, with respect to the sliding axis 36, when the plate 10 is thus oriented, so that a wedge effect laterally chasing the plate 10 is exerted. Thus, as the alignment segment 52 is initially in contact with a front end point of a front slide segment 14M of the lateral slide 14A, the rest of the slide 14A extends in said external passage volume of the cylindrical portion 53, so as to constitute an oblique obstacle to its progression toward the rear of the cutter 30, when the screw 50 is screwed.

To ensure the desired lateral alignment, the lateral slide 14A, having a certain height, is arranged so that the alignment segment 52, when it moves toward the rear of the cutter 30, comes into lateral contact with the lateral slide 14A at a relatively small angle, from a view (FIG. 5) according to a plane parallel to the plane of extension of the base 41, so that, in this way, the alignment segment 52 moves the lateral slide 14A away from its path, with a sufficient lateral thrust component toward the longitudinal side 44, by the wedge effect, as shown by the arrow F1 of FIG. 5 starting at the corner edge 8 and cutting the lateral slide 14A and not the rear alignment side 45. Thus, the longitudinal flank 4 is pressed against the longitudinal side 44 before the rear alignment flank 5 comes into contact with the rear alignment side 45. Once lateral contact has been established on the longitudinal side 44, the lateral slide 14A permits the continued movement of the alignment segment 52 toward the rear of the cutter 30.

To do this, the rear slide segment 14N of the lateral slide 14A can be arranged parallel to the sliding axis 36, so as to avoid exerting a notable reaction force on the alignment segment 52. It is nevertheless possible for the rear slide segment 14N also to extend, from a view in a plane parallel to the plane of extension of the base 41, also obliquely with respect to the sliding axis 36, according to an angle adapted so that the alignment segment 52 exerts an increasing but not excessive lateral pressure, i.e. an elastic return by bending of the screw 50, ensuring, in operation, that the lateral alignment is maintained even in the case of vibrations. The rear slide segment 14N can also have a surface turned somewhat upward (FIG. 6), opposite the lower face 2, i.e. a rising clamping ramp against the base 41. The rear slide segment 14N can in particular turn progressively, from a plan view, according to a spiral path with a decreasing pitch, so as to tend to be oriented transversely, i.e. to acquire a frontal ramp component, as shown in FIG. 6.

The lateral slide 14A thus comprises the front slide segment 14M constituting a ramp or slide so as to effortlessly deflect, according to a direction parallel to the arrow F1, the sliding path of the plate 10 on the base 41 toward the longitudinal side 44, therefore ensuring the lateral alignment, followed by the rear slide segment 14N constituting a rising ramp tending to deflect the alignment segment 52 at a distance from the base 41, which ensures the vertical clamping toward it. The rear alignment, by thrusting against the rear alignment side 45, can be ensured, by a wedge effect, by the rear slide segment 14N, if it extends obliquely and somewhat upward, with respect to the sliding axis 36. The frontal ramp 14 is then optional, since its function is integrated into the rear slide segment 14N.

The lateral slide 14A forms, from the top view, with the direction of extension 4D of the longitudinal flank 4, an apex angle A (FIG. 5) pointing toward the front, i.e. on the upper face 1, a plate forming a trapezoidal relief area 11, or wedge, is defined, of which the base is axially behind. The sliding axis 36 forms an angle B with the direction of extension 44D of the longitudinal side 44. The apex angle A is greater than angle B, and the wedge angle C represents their difference so that, in the translation, toward the rear of the cutter 30, of the alignment segment 52 according to the sliding axis 36, in order to finally come into contact with the frontal ramp 14, the cylindrical portion 53, sliding on the lateral slide 14A, opens its axial path by laterally thrusting the lateral slide 14A toward the longitudinal side 44. The arrow F0 parallel to the sliding axis 36, showing the trajectory of an initial current contact point of the lateral slide 14A receiving the cylindrical portion 53 in contact, shows that this trajectory is directed toward a base area of the trapezoidal relief 11, i.e. it tends to be contained in the plate 10 volume corresponding to the trapezoidal relief 11. It is noted, however, that it is the tilt, according to the wedge angle C, between the direction of extension 14G of the lateral slide 14A with respect to the sliding axis 36, which makes it possible to obtain the desired lateral alignment, i.e. the shape, in this case a trapezoid, of the relief 11 does not constitute an essential element, and the directions of extension 4D and 44D of the longitudinal flank 4 and the longitudinal side 44, respectively, are alternatively capable of being oriented differently because they serve first as a stop, at the end of a first screwing phase, and not as a wedge since the alignment contact is not yet established. It is only in a second phase, of tightening and no longer of lateral alignment, that a corner wedge effect occurs for lateral clamping.

Thus, in the first screwing phase, for the lateral alignment, when the cylindrical portion 53 progresses toward the rear of the cutter 30 and therefore toward the base area of the trapezoidal relief 11, a circular area for connection of the cylindrical portion 53 with the conical portion 54 distances the plate 10 by thrusting the front slide segment 14M toward the longitudinal side 44, effortlessly insofar as the longitudinal flank 4 can be retracted by freely laterally moving back, i.e. it is not yet pressed against the longitudinal side 44. The current contact point of the cylindrical portion 53 on the front slide segment 14M therefore follows a front path segment 14MT that is horizontal and parallel to the sliding axis 36, i.e. parallel to the base 41. FIG. 5 shows the relative position of the front path segment 14MT on the front slide segment 14M, and not its absolute position with respect to the cutter 30. Indeed, in consideration of the lateral chase of the lateral slide 14A during screwing, the front path segment 14MT has an absolute position, with respect to the cutter 30, which is parallel to the sliding axis 36, according to the arrow F0.

The plate 10 then occupies the position indicated by the dotted lines, the corner edge 8, delimiting the longitudinal flank 4, reaching the intermediate contact point 441, at the rear end of the front segment 440, after a movement according to the arrow F1. The lateral landing of the rest of the longitudinal flank 4 occurs substantially at the same time, within a certain degree of uncertainty associated with the fact that the longitudinal flank 4 is not necessarily initially exactly parallel to the longitudinal side 44.

The second screwing phase, for increased clamping in the lateral alignment position, begins when the cylindrical portion 53 reaches the level of an area, of trapezoidal relief 11, having a width corresponding to a space remaining free between a intermediate current contact point 141 of the cylindrical portion 53 on the lateral slide 14A and an opposite area of the longitudinal side 44.

Thus, in FIG. 5, the radial distance (measured according to a perpendicular to the direction of extension 44D) between the arrow F0, of which the base constitutes the start of the front path segment 14MT, and the intermediate current contact point 141, representing the distance of said lateral chase, is equal to the distance between the longitudinal flank 4 and the longitudinal side 44.

When the screwing is continued, after alignment, the rear slide segment 14N of the lateral slide 14A cannot therefore move away from the trajectory of the cylindrical portion 53, and it therefore exerts, on the alignment segment 52, a radial force that tends to cause it to bend laterally. Therefore, only a short screwing stroke is needed for the second phase, for sliding, according to the arrow referenced F2, colinear with the direction of extension 44D, on a rear segment 442 of the longitudinal side 44, between the intermediate contact point 441 and the female corner edge 451. At the beginning of the second phase, the rear alignment flank 5 is therefore at a relatively short distance, of a predetermined axial end of stroke, from the rear alignment side 45. Specifically, the distance of the end of stroke, or the length of the rear segment 442, is determined so that, in consideration of the value of angle C, and in consideration of the cantilever length of the alignment segment 52 with respect to the guide hole 35, the bending of the alignment segment 52 remains within an elastic deformation range, and, in addition, the screwing force, to be exerted by the user in the second phase, remains limited. The aforementioned bending therefore offsets the alignment segment 52 in a direction with a radial component, moving it away from the longitudinal side 44 and, in general, from the general axis 31.

In the second phase, the cylindrical portion 53 thus exerts an increasing pressure on the rear slide segment 14N. As the rear slide segment 14N has, in this example, an orientation in which it is turned somewhat opposite the lower face 2, therefore somewhat upward, a rear path segment 14NT, substantially according to the direction of extension of the rear slide segment 14N, also constitutes a rising ramp, so that the current contact point of the cylindrical portion 53 rises higher on it, as shown in FIGS. 5 and 6 with the elevated position of a final contact point 142 of the alignment segment 52 on the rear clamping segment 14N. In addition to the lateral clamping, the cylindrical segment 53 thus ensures the clamping toward the base 41.

In a third phase, the rear alignment flank 5 has been pressed against the rear alignment side 45, the conical portion 54 then performs a rising movement on the frontal ramp 14 according to a path shown by the arrow F14 so as to reach a high contact point 140. Unlike in the drawing of FIG. 5, the frontal ramp 14 can alternatively be designed with a front end, at the bottom of the ramp, located laterally opposite an intermediate point of the rear slide segment 14N, and not, as shown, opposite the rear end of the rear slide segment 14N. In this way, the rising movement of the alignment segment 52 can begin in the second phase. Thus, the rear slide segment 14N and the frontal ramp 14 can be replaced by a single equivalent segment, i.e. turned partially toward three directions, namely upward, forward and radially outward, i.e. opposite the bottom point of the female corner edge 451. This bottom point represents the lower corner of the housing 40 toward which the plate 10 must be thrust by its upper face 1 in order to ensure the clamping according to the three desired degrees of freedom, corresponding to the three directions of orientation of the single segment mentioned above.

In this example, and as shown in FIG. 4, the lateral slide 14A is provided in an area of increased thickness of the upper face 1, in which the trapezoidal relief area 11 is delimited. More specifically, this overthickness is provided with a groove 14R with a base 14F between two flanks of which one is the lateral slide 14A delimiting the trapezoidal relief 11, opposite a nonfunctional flank, which can therefore be omitted, with the groove 14R then delimiting a single lateral shoulder. The frontal ramp 14 blocks a rear end of the groove 14R, i.e. it constitutes a final rear but frontally-oriented flank of the lateral slide 14A.

As the groove 14R in this case has a limited depth with respect to a diameter of the alignment segment 52, only a lower part of the cylindrical portion 53 is in contact with the lateral slide 14A, so that, in addition to the desired force component parallel to the base 41 for the wedge effect by the trapezoidal relief 11, is in this case a vertical component, for pressing toward the base 41. The bending of the alignment segment 52 mentioned above therefore also has a vertical component, moving it away from the base 41. Therefore, there is already, in the second phase, a clamping effect against the base 41.

It is noted that the tilt, or slope, of the lateral slide 14A with respect to the vertical does not constitute an essential parameter. Indeed, the alignment segment 52 could absolutely (except for problems of wear) be in contact only with an upper edge line separating the lateral slide 14A from the upper face area 1 corresponding to the trapezoidal relief area 11. It is in fact the relative position of the alignment segment 52 with respect to this edge line that would determine the direction of the thrust and clamping force exerted on the plate 10.

In the third phase, it is the conical portion 54 that is involved, as mentioned above, by cooperation with the frontal ramp 14 containing the rear end of the groove 14R. It then contributes a bending component to the alignment segment 52 moving it away from the base 41.

To summarize, the trajectory of the plate 10 is such that it first lands, preferably very obliquely, by a soft lateral thrust, for example, by control according to a wedge angle C between 10 and 45 degrees, on the longitudinal side 44 so as to then slide above in the second phase, which ensures that the aforementioned lateral contact is maintained owing to the elastic bending of the alignment segment 52 providing a return force that, in operation, opposes the vibration forces.

It is noted that the shape of the cylindrical portion 53 (or slightly conical so as to be adapted to the tilt of the slide 14A and better support it above) has in particular a benefit in the second phase, for providing a sufficient contact surface so as to avoid damage in the "hard" contact, under pressure on the lateral slide 14A, while the first phase does not comprise a "hard" contact, so that a punctual contact may be suitable.

The cylindrical portion 53 can therefore alternatively be omitted, as its function is provided by the periphery of a cone base portion of the conical portion 54, i.e. with a maximum diameter, which base portion then becomes, when the cylindrical portion 53 is eliminated, the free end surface 52A of the screw 50. For the second phase, the rear slide segment 14N can have, from a plan view, an increased tilt or slope with respect to the front slide segment 14M, i.e. with a locally increased apex angle A. In this way, in the second phase, it is then the conical portion 54 that will undergo the bending force component opposite the longitudinal flank 4, while simultaneously being capable of cooperating with the frontal ramp 14.

The frontal ramp 14 can be provided with a front bottom area occupying an axially forward position with respect to the description above, so that the third phase is initiated during the second phase, or even at the same time, or even before, if the final sliding, according to the arrow F2, of the longitudinal flank 4 on the longitduinal side 44 risks having excessive friction that could be remedied only by contact and rising on the frontal ramp 14.

In other words, the frontal ramp surface 14, of which each generatrix, in this case perpendicular to the direction of rise, is horizontal, i.e. parallel to the upper face 1, continues, toward the front of the cutter 30, by the same surface, but that, when going forward, tilts, or twists, progressively around the sliding axis 36 so as to adopt a desired slope angle in order to form the lateral slide 14A. Thus, due to this twisting, the alignment segment 52 receives, when it moves toward the rear, a normal reaction force at the surface of the lateral slide 14A, which force (has a component which) is initially horizontal, parallel to the base 41, will progressively turn upward, due to the twist progressively transforming the lateral slide 14A into the frontal ramp 14, for elevating the alignment segment 52. As indicated above, such a vertical elevation force already exists at the start since, in this example, the lateral contact of the alignment segment 52 is achieved by a portion of it that is both lateral and lower and is thus combined with a lower contact having the effect of the frontal ramp 14.

In general, so that the conical portion 54 exerts, on the frontal ramp 14, an alignment thrust force that has a main component parallel to the base 41, so that the sliding of the plate 10 to the rear alignment side 45 is facilitated regardless of the friction coefficient on the frontal ramp 14, the direction of the sliding axis 36 is rising or horizontal, or descending but then tilted downward by an angle of less than 45 degrees, preferably less than 15 degrees, on the so-called horizontal plane of extension of the base 41. The horizontal sliding of the plate 10 indeed requires only a horizontal thrust on the frontal ramp 14 with a sliding of the conical portion 54 on the frontal ramp 14 that will be more limited insofar as the angular difference between the direction of the sliding axis 36 and the plane of extension of the base 41 is low. If this angular difference is zero, the sliding on the frontal ramp 14 can therefore be zero. The risk of wedging by jamming of the alignment segment 52 on the frontal ramp 14 is therefore limited or zero.

With regard to the respective positions, with respect to the sliding axis 36, the frontal ramp 14 and the lateral slide 14A constitute two respective tracks, optionally merged into a single one, each having a certain difference or radial offset with respect to the sliding axis 36, wherein the offset decreases toward the rear due, respectively, to the rise of the frontal ramp 14, therefore opposite the base 41, and to the tilt of the lateral slide 14A opposite the longitudinal flank 4, to thus provide the two bending directions of the screw 50 indicated above. The local radii of the alignment segment 52, respectively at the level of the contact point of the conical portion 54 on the ramp 14 and at the level of the contact point of the cylindrical portion 53 on the lateral slide 14A, are obviously subtracted from the two offsets above, also in consideration of the deflection of the alignment segment 52.

A predetermined part of the periphery of a mouth area 35E of the guide hole 35 can be flared increasingly with respect to the rest of the periphery, in a predetermined corresponding azimuth direction, taking, as a reference, the sliding axis 36. In this way, the alignment segment 52 is borne by an external segment of the screw 50 having an increased cantilever length, which can therefore, under the effect of a predetermined lateral force, bend increasingly in the aforementioned direction. The mouth area 35E can thus have various parts that are flared differently from one another so as to have a variable bending moment according to the azimuth bending direction. It is thus possible to independently adjust two return torques, respectively vertical and horizontal, or more precisely in this case oblique, corresponding to the ramp 14 and to the lateral slide 14A.

The plate shown in FIG. 2 is in fact an alternative of the one in FIGS. 3 to 5, which alternative is intended to show a lock-in stop of the screw 50. For the sake of clarity of the drawing and the description on this particular point, the plate is shown without the lateral slide 14A.

When positioning the screw 50, a free rear end of the guided segment 55 is first applied to the mouth area 35E, however presenting the screw 50 obliquely because a contact surface 19 thus forms a baffle preventing axial presentation. The contact surface 19, turned toward the rear of the cutter 30, delimits a rear portion of an anti-backlash stop 18 with a substantially transverse, i.e. substantially radial extension, intended to prevent the loss of the screw 50. The anti-backlash stop 18 in this case forms a shoulder, or a rib, projecting on a front area of the upper face 1.

Specifically, the contact surface 19 is in this case a radial ramp extending obliquely with respect to a radial to the sliding axis 36, i.e. it has a radially external end inlet segment 19E radially opposite a radially internal end contact segment 19A, located substantially on the extension of the sliding axis 36 and preventing a relative backlash that would be enough for the screw 50, already screwed, to completely leave the guide hole 35. The end inlet segment 19E, for "loading" the alignment segment 52, is located slightly toward the front of the cutter 30 due to the tilt mentioned above, i.e. axially farther from the mouth area 35E of the guide hole 35, so as to make it possible to receive, against the end inlet segment 19E, the free end surface 52A.

Alternatively, the contact surface 19, with a horizontal extension in FIG. 2, can be provided on the cutter 30, and, for example, in this case, located on the longitudinal side 44, and specifically in front of the lateral guide surface 43, i.e. the contact surface 19 would then have a vertical direction of extension in FIG. 2 or 4. The general principle is similar to that of a gun cylinder, in which the chamber for receiving a bullet would have a size strictly adjusted in length, making it necessary first to position the front end of the bullet, so as to then insert it by pivoting around this end.

Also alternatively, the contact surface 19 could be located on an upper roof wall of the housing 40, opposite the base 41, i.e., in FIG. 2, it could be on a horizontal rib (18) as shown, but in a high position above the housing 40, secured to the cutter 30 and turned downward.

Also alternatively, the contact surface 19 can have a curved shape according to its radial direction of extension, with a constant or variable radius of curvature along its extension, with, as indicated above, an area substantially opposite the sliding axis 36 located at a minimum distance, in relation to the rest of the contact surface 19, with respect to the mouth area 35E of the guide hole 35.

During the loading, an area of the free end surface 52A is therefore placed in contact with the end inlet segment 19E of the contact surface 19, then the user pivots the screw 50 parallel to the plane of extension of the base 41, by thrusting the alignment segment 52 substantially toward the general axis 31 and more specifically toward the sliding axis 36, by substantially radial sliding on the contact surface 19, which thus constitutes a loading ramp or slide thrusting the alignment segment 52 by a wedge effect, toward the rear of the cutter 30, when said alignment segment 52 is manually thrust radially toward the sliding axis 36 to reach the desired functional axial position centred on the sliding axis 36, in which the free end surface 52A is in contact with the radially internal end contact segment 19A of the contact surface 19. The forward movement, in the substantially radially internal direction, of the alignment segment 52 sliding on the contact surface 19 starting from the inlet end 19E to the contact end 19A, thus occurs until it comes into contact with the lateral slide 14A, shown in FIGS. 3 to 5. When the initial loading phase of the screw 50 is complete, the screwing phase can then take place.

The contact surface 19 thus constitutes an upstream slide that serves to bring the alignment segment 52 into the functional position on the lateral slide 14A, which itself is functionally located upstream of the frontal ramp 14 in order to guide the alignment segment 52 to it.

The desired axial position of the alignment segment 52 is achieved by the fact that the pivoting of the screw 50 causes it to progressively penetrate, while still obliquely, the mouth area 35E, with the forward penetration according to the instantaneous pivoting position corresponding to the "axial forward movement", i.e. the slope from the plan view, with respect to a normal to the sliding axis 36 of the direction of extension of the contact surface 19. In addition, as the plate 10 is not yet clamped, the contact surface 19 can, as needed, be slightly thrust forward by the free end surface 52A of the screw 50.

In other words, the plate 10, or alternatively a wall of the housing 40, includes the anti-backlash stop 18, the lock-in of the screw 50 that has a predetermined length, which anti-backlash stop 18 comprises, between its two opposite ends 19E and 19A, the contact surface 19 in an oblique ramp with respect to a direction perpendicular to the direction of the sliding axis 36 of the screw 50. In the aligned position, the opposite ends 19E and 19A are located, with respect to the mouth area 35E, and specifically with respect to an instantaneous, or current, contact point of the free end of the guided segment 55 with it, at distances that are respectively slightly less than and at least equal to the length of the screw 50.

In FIG. 2, the frontal ramp 14 has, in this example, a transverse chain of a plurality of, in this case three, facets 15, 16, 17, tangential to a fictitious conical surface having the shape of the conical portion 54, so as to have the same number of sliding contact generatrices, in order to limit wear. The aforementioned generatrices are, however, functionally replaced by surfaces if each facet 15, 16, 17 has a curvature corresponding to that of the conical portion 54. The aforementioned chain forms a sort of triptych, with the facets 15 and 17, lateral and symmetrically opposite, being turned slightly toward one with respect to the other and toward the central and base facet 16, so as to form, with facet 16, a widely open cavity with a flared U-shaped cross-section. The lateral facets 15 and 17 also ensure, except the clearance of the screw 50 in the guide hole 35, a return force for centering the plate 10 with respect to the screw 50 and therefore with respect to the axis 51, then common to the guide hole 35 and to the screw 50. The facet 15, located on the radially internal side, can also be provided so as to perform the function of the lateral slide 14A.

Regardless of the embodiment, whether single or multiple as above, of the frontal ramp 14, it can have a tilt decreasing toward an apex area thereof, i.e. in the area closest to the rear alignment flank 5, so as to enable a final effective tightening without requiring the user to use excessive force.

The sliding axis 36 is not, however, in this example, exactly parallel to the general axis 31, but slightly tilted on it so that the direction of insertion of the screw 50 approaches the general axis 31, so that the axial sliding toward the rear, imparted on the plate 10 by the screw 50, is more easily accompanied by a radial sliding component toward the general axis 31, under the effect of the lateral slide 14A, i.e. the radially internal longitudinal flank 4 also acts, as indicated, as an alignment flank by pressing against the longitduinal side 44 of the housing 40. Thus, the frontal ramp 14 is at least partially turned opposite the point of junction of the lower, respectively longitudinal and rear, edges 24, 25 and of the corner edge 8.

Alternatively, the aforementioned tilt of the sliding axis 36 on the general axis 31 can have the opposite sign, i.e. with the conical portion 54 located in a position closer to the general axis 31 than the guided segment 55, so as to avoid the effects of unclamping by centrifugal force. In such a case, the frontal ramp 14 can, however, as the case may be, remain opposite the aforementioned junction point at the lower end of the corner edge 8. In general, the sole effect of the existence of a non-zero angle of tilt between the sliding axis 36 and the general axis 31 is that the conical portion 54 of the screw 50 will also move laterally on the frontal ramp 14 during screwing.

Also alternatively, it is possible for at least one oblique segment 59 (FIG. 5) of the rear alignment flank 5, which can, for example, form a bevelled connection with the active flank 3, have a straight or curved profile and a general direction of extension 59D (assuming that the plate 10 is appropriately oriented) non-perpendicular to the sliding axis 36. The rear alignment side 45 has, axially opposite the oblique segment 59, an oblique segment 459 oriented substantially according to direction 59D, so that the oblique segment 59 will slide above, toward the rear with a radially internal movement component toward the general axis 31. Such a wedge effect enables the plate 10 to slide radially and/or to turn on the base 41, so that at least one point of the longitudinal flank 4 comes into alignment contact with the longitudinal side 44. The direction of extension 59D of the oblique segment 59, which thus serves as an oblique stop bevel turned partially toward the rear and radially outward, therefore has, with respect to the sliding axis 36, an angle with a sign opposite the sign of an angle of tilt of the direction of extension 148 of the lateral slide 14A. The oblique segment 59 thus serves to offset, radially inwardly, i.e. toward the longitudinal side 44, the axial thrust provided by the screw 50. This is therefore a function identical to that of the lateral slide 14A.

The oblique segment 459 can be designed so as to constitute, with the longitudinal side 44, a sort of flared mouth located in front of a "base" segment 450 of the rear alignment side 45, i.e. located on the side of the corner edge 8 (FIG. 5). The base segment 450, except for the oblique segment 459, can have size that is equal to or even very slightly smaller than, that of the rear alignment side 5, so as to thus contain it in an adjusted manner between the longitudinal side 44 and the oblique segment 459.

Figure 7:
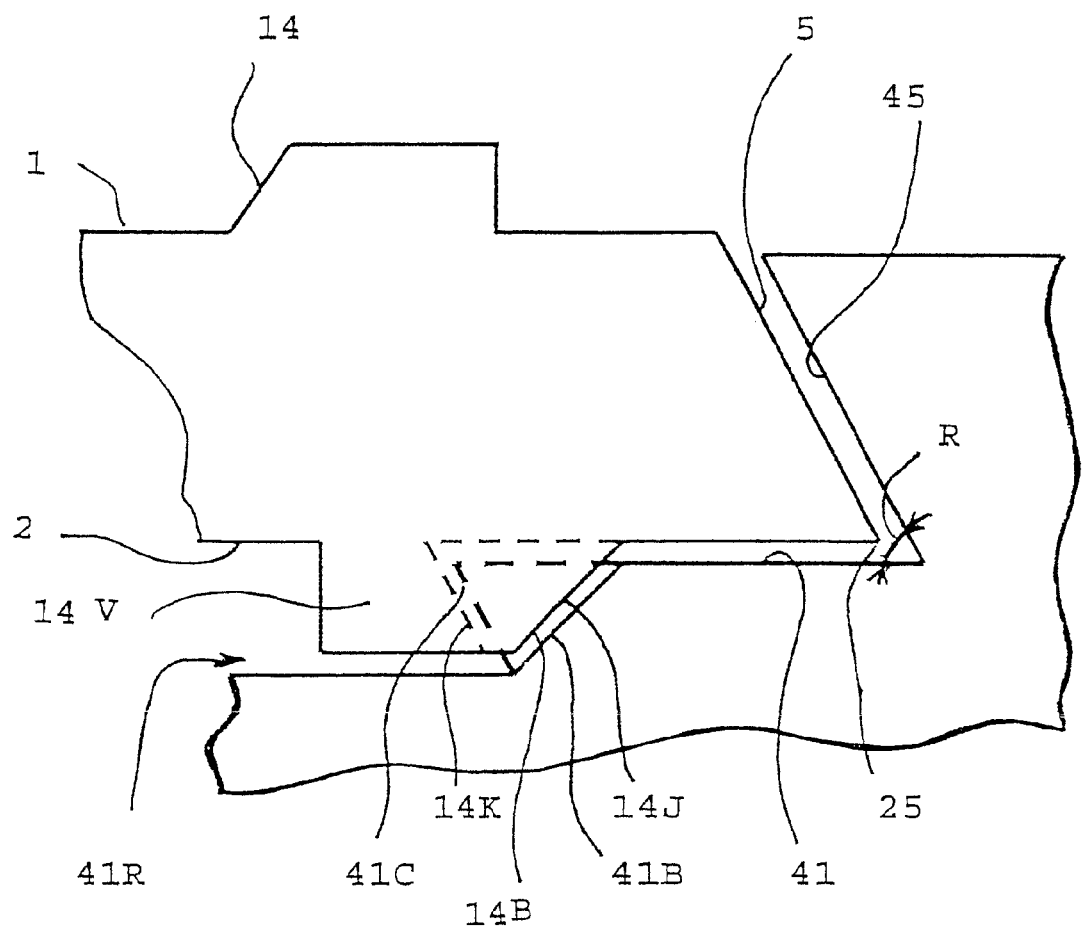
FIG. 7 is a partial lateral cross-section view of an alternative embodiment of the base of the housing and an alternative embodiment of the plate.

FIG. 7 is a cross-section view of the base 41 and an alternative of the plate 10, according to a vertical plane parallel to the general axis 31. It shows that the rear alignment side 45 can have a direction of extension turned down by less than 90 degrees toward the base 41, for example, by an angle R of 70 to 85 degrees, so as to form a cavity with an upper frontal ramp that, by the wedge effect, turns down, against the base 41, the rear flank 5 of the plate, forming a rostrum with a peak edge 25 that, otherwise, would be capable of vibrating because it is not opposite the central frontal ramp 14 and therefore does not directly receive the contact force. The same may apply to the longitudinal flank 4 with the longitudinal side 44.

In this alternative, the plate 10 is reversible top/bottom and simultaneously front/rear and thus capable of being implanted in two possible positions, with the rear rostrum edge 25 capable of being a cutting edge. In such a case, the frontal ramp 14 can be at the rear end of a groove, or, as shown in this case, it is the base 41 that comprises a groove 41R for passage of a rib 14V bearing a frontal ramp 14B, in relief toward the rear on the lower surface 2.

In this last case, the groove 41R can end with a rear alignment contact surface 41B, having the same function as the rear alignment side 45. The rear alignment contact surface 41B thus receives, in contact, (14B in FIG. 7) that of the two frontal ramps 14, 14B, which is in the overturned position under the plate 10 and which is turned toward the rear of the cutter 30, or receives a radially lateral shoulder surface 14J of the overturned frontal ramp 14B, which shoulder 14J (behind and extending radially perpendicularly to the cutting plane of FIG. 7) rises toward the plane of extension of the base 41 as it goes toward the rear of the cutter 30. The lateral shoulder 14J, in this case shown in the plane of the frontal ramp 14B, acts only as a rear stop and not as a front ramp, and can thus extend in a plane having any position with respect to the frontal ramp 14B, while having any desired tilt.

In particular, as shown with the dotted lines, the shoulder 14J can be in the form of a shoulder 14K having, with respect to a plane (vertical line in FIG. 7) radial to the general axis 31, a reverse tilt with respect to that of the frontal ramp 14B considered, to form a rostrum descending toward the rear, toward the right in FIG. 7, with a peak edge at the lower portion of the groove 41R, which rostrum cooperates with a cavity having a complementary shape, according to that described above for the rear edge 25. In such a case, the rear alignment contact surface 41B thus similarly has a lateral surface contact segment 41C, shown with dotted lines. If the shoulder 14J or 14K is present, the frontal ramp 14B may or may not be provided for abutment as well. An edge of the groove 41R can serve as a lateral slide edge and a clamping edge, as described for the longitudinal side 44.

The base 41 of the housing can alternatively extend in a slightly tilted plane, for example up to 15 degrees, with respect to the general axis 31. In such a case, it is possible for another of the housings 40B, 40C to have a base 41B, 41C extending in a plane having a tilt, with respect to the general axis 31, in the direction opposite that of said tilt of the housing 40.

In this example, the housing 40 is arranged so that the cutting edge 13 of the plate 10 extends radially up to the general axis 31 of the cutter 30, and the other housings 40B, 40C are arranged so that the associated cutting edge stops at a distance from the general axis 31. A central partition core separating housing 40 from the others 40B, 40C is thus reserved in order to ensure the solidity of the cutter 30.

The invention claimed is:

1. A removable cutting plate (10) comprising mounting means provided to cooperate with alignment means associated with a tool holder (30) so as to bring a contact face (2) of the plate into a functional position on the base (41) of a housing (40) of the tool holder, wherein the mounting means include a frontal thrust surface (14) provided in order to receive, once the plate (10) is placed in an initial, approximately functional position, a thrust force exerted by an alignment segment (52), in a predetermined direction of trajectory (F0, 36), belonging to a slide (50) mounted on the tool holder, so as to align, by sliding toward the rear on the base (41), a rear flank for alignment (5) of the plate (10) against a rear alignment side (45) delimiting the housing (40), wherein the plate is characterized in that the mounting means comprise a lateral slide (14A) for alignment of the plate and for guiding the alignment segment (52) toward the frontal thrust surface (14), and the lateral slide (14A) is arranged so as to form, with respect to the direction of trajectory (F0, 36), a wedge for offsetting the thrust force of the alignment segment (52) toward a longitudinal flank (4) for lateral alignment of the plate (10).

2. The plate according to claim 1, in which the lateral slide (14A) and the longitudinal flank (4) have mutually tilted respective directions of extension (14G, 4D).

3. The plate according to claim 1, in which the lateral slide (14A) and the rear alignment flank (5) have respective directions of extension (14G, 5D) delimiting an angle greater than 45 degrees.

4. The plate according to claim 1, in which the lateral slide (14A) extends in a direction of extension (14G) cutting, from the plan view, the rear alignment flank (5).

5. The plate according to claim 1, in which the lateral slide (14A) constitutes a shoulder delimiting, on an upper face (1) of the plate opposite the contact face (2), a plate (11) also limited by the longitudinal flank (4).

6. The plate according to claim 1, in which the lateral slide (14A) abuts the frontal thrust surface (14).

7. The plate according to claim 1, in which the frontal thrust surface (14) is a ramp for clamping against the base (41).

8. The plate according to claim 7, in which a rear slide segment (14N) of the lateral slide (14A) is turned partially opposite the contact face (2) in order to act both as said lateral offsetting slide and as the ramp for clamping against the base (4).

9. The plate according to claim 7, in which a rear slide segment (14N) of the lateral slide (14A) is turned partially opposite the contact face (2) in order to act both as said lateral offsetting slide and as the ramp for clamping against the base (4), and in which the rear slide segment (14M) is twisted toward the rear, while turning progressively toward the front and opposite the contact face (2), so that a final segment of the rear slide segment (14M) constitutes said frontal ramp surface (14).

10. The plate according to claim 1, in which a rear slide segment (14N) of the lateral slide (14A), provided for a final lateral tightening stroke by the alignment segment (52) after lateral alignment, has a direction of extension (14NT) different from a direction of extension (14MT) of a front slide segment (14M) of the lateral slide (14A), so as to fix, at the end of the stroke, for a predetermined length of the rear slide segment (14N), a predetermined deflection value of the alignment segment (52).

11. The plate according to claim 1, in which an upper face (1) of the plate, opposite the contact face (2), comprises a slide (50) lock-in stop (18, 19).

12. A machine tool holder comprising means (35, 50) for alignment, on the base (41) of a housing (40), of a removable cutting plate (10) with a frontal surface (14) for thrusting toward a rear alignment side (45) delimiting the housing (40) and with a lateral slide (14A) for alignment of the plate and for guiding according to one of claims 1 to 9, which tool holder is characterized in that the alignment means comprise means (35, 43) for guiding and holding in position a slide (50) that comprises an alignment segment (52) arranged so as, on the one hand, by sliding on the lateral slide (14A), to laterally thrust the plate (10) toward a longitudinal alignment side (44) delimiting the housing (40) and serving as an alignment stop for an associated longitudinal alignment flank (4) of the plate (10), and so as, on the other hand, to be guided by the lateral slide (14A) up to the frontal thrust surface (14) so as to thrust the plate (10) toward the rear alignment side (45).

13. The tool holder according to claim 12, in which the alignment segment (52) is arranged so as, after lateral alignment, to slide on a rear slide segment (14N) having a direction of extension (14NT) designed so that the alignment segment (52) exerts, by a wedge effect, a lateral elastic return force toward the longitudinal alignment side (44).

14. The tool holder according to claim 12, in which the lateral slide (14A) has a direction of extension (14G) forming, with a direction of the sliding trajectory (F0, 36) of the slide (50), a wedge angle (c) between 10 and 45 degrees.

15. The tool holder according to claim 12, in which the alignment segment (52) is slidably mounted in a direction of trajectory (F0, 36) cutting, from a plan view, the rear alignment side (45).

16. The tool holder according to claim 12, in which the alignment segment (52) and the lateral slide (14A) are arranged so that the alignment segment (52) also can exert a clamping force toward the base (41) of the housing (40).

17. The tool holder according to claim 12, in which the guide means include a guide hole (35) for a guided segment (55) of the slide associated with the alignment segment (52).

18. The tool holder according to claim 17, in which a mouth portion (35E) of the guide hole (35) is flared in a predetermined direction.

19. The tool holder according to claim 17, in which the guide hole (35) has a sliding axis (36) direction of extension defining a direction of compression of the slide (50) moving away from a general axis (31) of the tool holder (30).

20. The tool holder according to claim 17, in which the alignment segment (52) is mounted so as to rotate freely with respect to the guided segment (55) of the slide (50).

21. The tool holder according to claim 12, in which the longitudinal alignment side (44), radially internal with respect to a general axis (31) of the tool holder, extends substantially in a plane moving away from the general axis (31) of the tool holder when moving away, in the axial direction, from a free end of the tool holder.

22. The tool holder according to claim 12, in which the base (41) of the housing extends in a plane that is tilted with respect to a general axis (31) of the tool holder.

23. The tool holder according to claim 22, comprising another housing (40B, 40C) having a base (41B, 41C) extending in a plane having a tilt, with respect to the general axis (31), in the direction opposite that of said tilt of said housing (40).

24. The tool holder according to claim 12, in which the housing (40) includes a slide (50) lock-in stop, wherein the slide (50) has a predetermined length and the stop comprises two opposite ends delimiting a ramp surface that is oblique with respect to a direction perpendicular to a guiding direction (51) of the slide (50) defined by the guide means (35, 43), wherein said opposite ends are located, with respect to a current contact point of the slide (50) on a mouth (35E) of the guide hole (35), at distances respectively less than and equal to the length value of the slide (50).

25. The tool holder according to claim 12, in which the rear alignment side (45) is turned down so as to extend substantially according to an acute angle (R) with respect to the base (41) of the housing (40) and thus form a ramp holding down a rear alignment flank (5) of the plate toward the base (41) of the housing (40).

26. The tool holder according to claim 12, in which the base (41) of the housing (40) comprises a groove (41R) for receiving a rib (14V) of the plate bearing a second frontal thrust surface (14B), for a so-called reversible plate, associated with a rear contact shoulder (14J, 14K) for contact on an end surface (41B), for rear alignment contact, belonging to the groove (14R).

27. The tool holder according to claim 12, comprising at least three of said housings (40, 40B, 40C).

28. The tool holder according to claim 12, comprising at least three of said housings (40, 40B, 40C), in which a first (40) of the housings is arranged so that a cutting edge (13) of the plate (10) extends radially up to a general axis (31) of the tool holder, with a second (40B, 40C) of said housings being arranged so that the associated cutting edge stops at a distance from the general axis (31).

29. A method for positioning a cutting plate (10) in a tool holder (30) housing (40), comprising:

obtaining a tool holder (30) equipped with a plate having a frontal thrust surface (14) and a lateral slide (14A) for aligning and guiding an alignment segment (52) toward the frontal thrust surface (14), placing the plate (10) on a base (41) of the housing (40) in a substantially functional position, sliding the slide (50) so that an alignment segment (54) performs, in a first phase, a lateral alignment of the plate (10) against a longitudinal alignment side (44), by sliding with lateral thrust on the lateral slide (14A) and so that the alignment segment (52) is guided up to the frontal thrust surface (14) so as to cause, in a second phase, an alignment against a rear side (45) of the housing (40).

30. The method according to claim 29, in which a direction of extension (14NT) of a rear segment (14N) of the lateral slide (14A), for said guiding toward the frontal thrust surface (14), is chosen so that the alignment segment (52) exerts, by a wedge effect, in the second phase, an elastic return force toward the longitudinal alignment side (44).

* * * * *